United States Patent [19]

McArthur et al.

[11] 4,256,718

[45] Mar. 17, 1981

[54] SODIUM ZIRCONIUM CARBONATE COMPOUND AND THE METHOD OF ITS PREPARATION

[75] Inventors: Mary J. McArthur, Simi Valley; Laurence B. Marantz, Sherman Oaks; Abb L. Scarbrough, Calabasas, all of Calif.

[73] Assignee: Organon Teknika Corporation, Oklahoma City, Okla.

[21] Appl. No.: 5,671

[22] Filed: Jan. 24, 1979

Related U.S. Application Data

[63] Continuation-in-part of Ser. No. 890,650, Mar. 20, 1978, abandoned.

[51] Int. Cl.$^3$ .................. C01B 31/24; C01D 7/00; C01G 25/00
[52] U.S. Cl. .................. 423/419 P; 423/593
[58] Field of Search ............ 423/419, 419 P, 420–428, 423/593, 305, 71, 84, 85

[56] References Cited

U.S. PATENT DOCUMENTS

| | | | |
|---|---|---|---|
| 2,316,141 | 4/1943 | Wainer | 423/419 |
| 3,510,254 | 5/1970 | Bell | 423/419 |
| 3,551,095 | 12/1970 | Blumenthal | 423/419 |
| 3,961,026 | 6/1976 | Pokhodenko et al. | 423/419 P |
| 4,042,672 | 8/1977 | Bugger et al. | 423/419 |

FOREIGN PATENT DOCUMENTS 2510743 9/1975 Fed. Rep. of Germany ....... 423/419 P

OTHER PUBLICATIONS

Popseplova et al., Carbonato-Compounds of Zirconium, Russian Journal of Inorganic Chemistry, vol. II, #8 (Aug. 1966), pp. 995–1004.
Handbook of Chemistry & Physics, 43rd Edition, Chemical Rubber Co., Cleveland, Ohio, 1961, p. 1726.

*Primary Examiner*—O. R. Vertiz
*Assistant Examiner*—Gary P. Straub
*Attorney, Agent, or Firm*—Robert H. Falk; William C. Steffin; Francis W. Young

[57] ABSTRACT

There is disclosed a sodium zirconium carbonate compound and the method of its preparation. The sodium zirconium carbonate compound is formed from a metastable aqueous solution comprising zirconium, sodium, sulfate, and carbonate ions.

38 Claims, No Drawings

SODIUM ZIRCONIUM CARBONATE COMPOUND AND THE METHOD OF ITS PREPARATION

This application is a Continuation-In-Part of pending application Ser. No. 890,650 filed Mar. 20, 1978 now abandoned in the name of the joint inventors herein.

BACKGROUND OF THE INVENTION

The present invention relates in general to a sodium zirconium carbonate compound and the method of its preparation. In particular, the present invention relates to a novel sodium zirconium carbonate compound which, when prepared according to the method of the invention exhibits a substantially uniform particle size.

It is known in the art to make zirconium carbonate compounds by precipitating the compounds from a solution of zirconium sulfate and alkali carbonate at a pH of about 6 to 7 as disclosed in Wainer U.S. Pat. No. 2,316,141 and Brownlee German Pat. No. 2,510,743. Wainer also teaches that at a lower or higher pH, the zirconium compound redissolves. A sodium zirconium carbonate having the empirical formula $Na_4[ZrOZr(OH)_2(CO_3)_4]\cdot 8H_2O$ is reported by Pospelova and Zaitsev in the *Russian Journal of Inorganic Chemistry* pp. 995-1004, Vol. II No. 8 (August 1966). The compound is formed by adding zirconium oxychloride solution to hot saturated sodium carbonate and is readily soluble in water.

The sodium zirconium carbonate compound of the present invention can be used in the preparation of zirconium phosphate which is useful as an ion exchanger. In some applications, it is desired to obtain zirconium phosphate particles having a uniform particle size. It is known in the art that the particle size of the zirconium phosphate product can be controlled by controlling the particle size of the zirconium starting material. Therefore, in order to form a zirconium phosphate product which has a uniform particle size range it is desirable to begin with a starting material which has a uniform particle size range.

SUMMARY OF THE INVENTION

It is therefore an object of the present invention to provide a novel sodium zirconium carbonate compound.

It is further an object of the present invention to provide a method for forming the sodium zirconium carbonate compound.

It is also an object of the present invention to provide a method for forming a novel sodium zirconium carbonate compound having a uniform particle size.

These and other objects are obtained by forming a sodium zirconium carbonate compound from an aqueous metastable solution at a pH of from about 8 to about 11.5 wherein the solution comprises zirconium, sodium, sulfate, carbonate and optionally chloride ions. The sodium zirconium compound is formed by precipitation from the metastable solution upon heating. The solution temperature is preferably raised at a slow rate to a temperature greater than about 90° C. The compound of the present invention is substantially insoluble in water and preferably has a uniform particle size. A more thorough disclosure of the objects and advantages of the present invention is presented in the detailed description which follows.

DETAILED DESCRIPTION OF PREFERRED EMBODIMENT

The sodium zirconium carbonate compound of the present invention is a hydrate at temperatures below about 70° C. and its ionic composition corresponding to analysis is: $(Na)_A (Zr)_B (CO_3)_C$ wherein when B, measured as $ZrO_2$, is assigned the value 1, A has a value of from about 0.8 to about 1.2 and C, measured as $CO_2$, has a value of from about 0.8 to about 1.2. It will be appreciated that the values of A, B, and C reflect the ratios of the molecular units within the compound of the invention and not the actual number of molecular units in any particular compound molecule.

The molecular structure of compounds according to the invention has not been determined. However, the compounds are believed to be complex, olated polymers. The charge balanced formula equivalent to the composition according to analysis would be as follows if the elemental components are expressed as Oxides: $(Na_2O)_{0.4-0.6}(ZrO_2)(CO_2)_{0.8-1.2}\cdot xH_2O$. As will be apparent to those skilled in the art, the compounds of the invention may be expressed by still other empirical formulae and the invention is not limited by the expressions presented herein. The inventors prefer the expression for the ionic composition corresponding to analysis because the values for A, B and C may readily be determined by analytical procedures well-known to those skilled in the art.

The compound is usually formed as a hexahydrate wherein x is 6 but the extend of hydration of a particular sample will depend on its heat history and the invention is not limited to any particular hydrate.

The compound decomposes without melting and, after drying at 70° C. for two hours is a hexahydrate, and has an index of refraction of about 1.64-1.67. The compound is non-crystalline and substantially insoluble in water such that it can be washed in water to remove impurities without any appreciable loss of weight or detectable loss of zirconium ions. The method of the invention produces particles of a shape generally resembling grape clusters.

A feature of the method of the invention is that sodium zirconium carbonate particles of a substantially uniform particle size may be produced whereby the particulate product of a given batch produced under the same set of conditions will be of substantially uniform particle size. As used herein "uniform size" means that the particle size of at least 90% of the particulate product of a given set of reaction conditions within the scope of the method of the invention will be within about 50% of the number median diameter of said particulate product. For a representative sample of the product, the diameter of 50% of the number of particles will be greater than and the diameter of 50% of the number of particles will be less than the "number median diameter". The method of the invention is capable of producing a substantially uniform particulate product having a number median diameter as small as about 2 microns. When zirconium ion exchangers are to be prepared from the sodium zirconium carbonate of the invention the number median diameter is preferably from about 2 microns to about 75 microns.

The sodium zirconium carbonate of the present invention is preferably formed from an aqueous solution at a pH of from about 8 to about 11.5 accompanied by slow heating to a temperature greater than about 90° C. The solution prior to heating is in a metastable state and is preferably comprised of the following ions in solution at about the following molar ratios:

| Ions | Suitable Molar Ratios (Approx.) | Preferred Molar Ratios (Approx.) |
|---|---|---|
| Zr* | 1 | 1 |
| Na | 6–10 | 8 |
| SO$_4$ | 2–3 | 2 |
| Cl | 0–2 | 2 |
| CO$_3$** | 2–4 | 2 |

*Concentration measured as ZrO$_2$
**Concentration measured as CO$_2$

We have found that the sodium zirconium carbonate of the invention is formed when the concentration of the zirconium ion in the metastable solution is maintained at above about 0.3 molar. As the zirconium ion concentration approaches about 0.9 molar, longer heating times are required to form the product of the invention. The molar ratios of the ions in the metastable solution are preferably maintained within the ranges specified above to enable the formation of the sodium zirconium carbonate compound of the present invention. The concentration of sodium ion is adjusted so that the molar ratio of the sodium ions to zirconium ions is preferably maintained at about 6–10. Lower sodium molar ratios have been found to result in unstable solutions and premature precipitation.

It is preferred that the molar ratio of the sulfate ions to the zirconium ions be maintained at a value of about 2–3. At a value of about 1.5, the metastable solution is not formed. The molar ratio of the carbonate ions to zirconium ions is preferably about 2–4. If the molar ratio is lower than about 1.5, the metastable solution is not formed. With higher carbonate ratios there is a reduced yield of the product. The molar ratio of the chloride ions to zirconium ions is maintained at about 0–2. If the molar ratio of the chloride ion is increased above about 3, the product of the present invention is not formed.

One preferred method of forming the metastable solution of the present invention is by neutralizing acid zirconium sulfate with a suitable base. The neutralization of the acid zirconium sulfate can be achieved by either a one-step or a two-step process. In the one-step process the pH of an acid zirconium sulfate solution is adjusted to at least about 8 with a suitable base such as sodium carbonate, bicarbonate or sesquicarbonate. Preferably the pH is adjusted to about 9.5–10 with sodium carbonate or sesquicarbonate.

In the two-step process, the first step preferably comprises partially neutralizing the acid zirconium sulfate with a suitable base such as sodium hydroxide, carbonate, bicarbonate or sesquicarbonate to a solution pH of about 1.6. The second step of the two-step process comprises adjusting the solution pH to at least about 8 utilizing a suitable base such as sodium carbonate, bicarbonate or sesquicarbonate. More preferably the pH is adjusted to about 9.5–10 with sodium carbonate or sesquicarbonate.

When utilizing acid zirconium sulfate as a starting material to form the compounds of the present invention, sodium hydroxide may be used only in the first step of the two-step process. It has also been found that the product of the invention is not formed when potassium or ammonium bases are substituted for all or a significant part of the sodium bases in the one or two-step process when acid zirconium sulfate is the starting material.

In both the one and two-step processes the mixing steps are conducted at ambient temperature, as for example 20°–25° C. and the zirconium solution is added to the base which initially causes the formation of a precipitate which subsequently redissolves to form a clear solution. The zirconium solution is added at a slow, preferably steady rate, such that initially formed precipitates are redissolved. When the acid zirconium sulfate has been completely neutralized, the resulting clear solution is in a metastable state. Excessive rates of addition are readily indicated by the formation of a precipitate which will not redissolve, whereby the metastable solution is not formed.

To form the product of the present invention, the metastable solution is preferably heated at a slow rate. Precipitation normally begins at about 45°–50° C. Heating is continued at the slow rate to a temperature of greater than about 90° C. preferably about 100° C. and more preferably to the solution boiling temperature. The solution is held at the higher temperature preferably with boiling for about one hour. At higher concentrations of zirconium ion, the solution is preferably held at about 90° C. for longer periods of time such as 6 to 8 hours. When the solution is not held at above 90° C., the product of the invention is not formed and the precipitate is water soluble.

The compound of the present invention can also be formed at a pressure greater than atmospheric pressure such as at about 12.5 psig. It is believed higher pressures will also be operable. However, even at the higher pressures, the solution is preferably heated to a boil to form the product of the present invention.

The metastable solution is preferably heated at a slow rate of from about 0.3° to about 0.5° C. per minute whereby uniform size particles having number median diameters of from about 2 microns to about 75 microns may be formed. It has been found that, other variables being held constant, particle size is dependent on heating rates. The invention is not limited to particular heating rates and rates of about 0.1° C. and about 1.1° C. per minute have provided the product of the invention.

It is preferred that sodium chloride be added to the solution prior to heating. The sodium chloride appears to control or regulate nucleation and thereby affect particle size. When a product in the 50–75 micron range is desired the molar ratio of the chloride ion to the zirconium ion is adjusted to about 2. The chloride ion can also be supplied by hydrochloric acid which converts to ionized sodium chloride in the basic solutions.

The sulfate ions can be supplied to the solution from any suitable source such as sodium sulfates (sodium sulfate, sodium bisulfate and their hydrates) and sulfuric acid as well as from acid zirconium sulfate. Similarly, carbonate ions can also be supplied by carbonic acid.

The metastable solution of the present invention can also be formed utilizing zirconium oxychloride as starting material. The solution may be formed by first contacting the zirconium oxychloride with sodium sulfates or sulfuric acid and then adjusting the pH of the resulting solution in one or two steps to form the metastable solution of the present invention.

The zirconium compounds of the present invention can be advantageously utilized to make zirconium phosphate and hydrous zirconium oxide which are useful as ion exchangers. A suitable method of converting the sodium zirconium carbonate compounds of the present invention into zirconium phosphate is disclosed in the Marantz et al., U.S. Pat. No. 3,850,835, the disclosure of which is incorporated herein by reference.

The invention will be better understood by reference to the following specific but illustrative examples wherein the analysis of the product is presented as an ionic formula exclusive of water of hydration. Unless otherwise stated the product was recovered by filtration and washed with water. Yields were determined by measuring the zirconium content of the product. The particle size ranges given are the ranges which include at least 70% of the particles of the sample. The ionic ratio formula was determined according to the following analytical techniques.

Zirconium was determined by dissolving a weighed sample of about one gram of the sodium zirconium carbonate product in 50 ml of 6 N.HCl. Concentrated ammonium hydroxide was added to a pH of 9–10. The precipitate was filtered through ashless filter paper (Whatman #41), and washed with 200 ml water.

The zirconium oxide precipitate was dried at 105° C. for two hours, transferred with the filter paper to a tared platinum crucible and slowly heated in a muffle furnace until smoking ceased. The sample was then placed in a 900° C. furnace for at least two hours, cooled in a dessicator and the zirconium oxide was weighed.

Sodium was determined by dissolving a weighed sample of about five grams of the sodium zirconium carbonate in 20 ml concentrated hydrochloric acid, diluting to 100.0 ml with water. The sodium concentration was then read on a flame photometer (Instrumentation Laboratories Model 143).

Carbonate was determined by placing a weighed sample of about one gram of the sodium zirconium carbonate product in a small container in a sealable flask. 25 ml of 5 N. sulfuric acid was added to the flask so as not to mix with the product in the container and the flask was sealed with a two-holed rubber stopper fitted with an air inlet tube extending to the bottom of the flask and a outlet tube fitted with a calcium chloride drying chamber. The entire assembly was weighed and the flask agitated to mix the sodium zirconium carbonate in the container with the sulfuric acid. Dry air was bubbled through the solution for 15 minutes. The assembly was reweighed. The difference in weight is $CO_2$ which has escaped from the flask.

EXAMPLE ONE

The metastable solution was formed by the one step neutralization of a 190 ml solution of 2.05 molar acid zirconium sulfate (0.39 mole). The carbonate solution was formed by dissolving 128.3 grams (1.21 moles) of sodium carbonate in 400 ml of water. The zirconium solution was added to the carbonate solution with stirring at a temperature of about 20° C. There was gas evolution and the temperature increased to about 40° C. A precipitate formed with the addition of the zirconium solution but the precipitate redissolved. The solution was then cooled to 27° C. and 154 ml of 5.05 molar sodium chloride was added to the solution. The clear metastable solution thus formed had a molar ratio of the ions of $ZrO_2:SO_4:Na:CO_3:Cl$ of 1:2:8.2:2:2. The solution was heated at a rate of 0.3° C./minute to 100° C. and boiled for about one hour. The product was comprised of uniformly sized particles of from about 20–25 microns. The ionic composition was $Na_{1.1}Zr_1(CO_3)_1$. 173.5 grams of the product was recovered for a yield of 80.4 percent based on $ZrO_2$. Precipitation began at 48° C.

EXAMPLE TWO 232 ml of a 1.68 molar solution of acid zirconium sulfate (0.39 mole) was neutralized in a two-step process. In the first step, 0.78 mole of sodium hydroxide as a 50 percent aqueous solution and 0.04 mole of sodium carbonate solid anhydrous was added to the solution to change the pH of the solution to 1.6. In the second step, the zirconium solution was added to 404 ml of 1.93 molar sodium carbonate (0.78 mole) to form a clear metastable solution having a pH of about 10.0. The metastable solution had a molar ratio of ions of $ZrO_2:SO_4:Na:CO_3:Cl$ of 1:2:6.2:2:0. A precipitate was formed during the second step of the process but it quickly redissolved. The metastable solution was then heated at a rate of 0.3° C./minute to a temperature of about 100° C. and boiled for a period of about one hour to precipitate the product. 253.8 grams of product was recovered for a yield of 88.9 percent based on $ZrO_2$. The product was comprised of uniformly sized particles of from about 5–10 microns and had an ionic composition of $Na_1Zr_1(CO_3)_{0.9}$. Precipitation began at 63° C.

EXAMPLE THREE 232 ml of 1.68 molar acid zirconium sulfate (0.39 mole) was neutralized with 0.78 mole of sodium hydroxide and 0.04 mole of sodium carbonate to a pH of 1.6. The resulting solution was then further neutralized by adding the solution to 400 ml of 1.95 molar sodium carbonate (0.78 mole) to form a solution. A precipitate was formed during the second neutralization step but redissolved. 154 ml of 5.05 molar sodium chloride solution was then added to the solution. The metastable solution had a molar ratio of ions $ZrO_2:SO_4:Na:CO_3:Cl$ of 1:2:8.2:2:2, and was heated at a rate of 0.5° C./minute to boiling and was held at about 100° C. for about one hour. Precipitation began at 51° C. and 228.7 grams of product was recovered for a yield of 81.5 percent. The product was comprised of uniformly sized particles of from about 50–75 microns having an ionic composition of $Na_1Zr_1(CO_3)_1$.

EXAMPLE FOUR 232 ml of 1.68 molar acid zirconium sulfate (0.39 mole) was neutralized with 0.78 mole of sodium hydroxide and 0.04 mole of sodium carbonate to a pH of 1.6. The solution was then completely neutralized by adding it to a solution comprising 131 grams of sodium bicarbonate slurried in 400 ml of water at a temperature of 20° C. A precipitate was formed but it was redissolved. 154 ml of 5.05 molar sodium chloride was then added to form the metastable solution, which had a molar ratio of ions of $ZrO_2:SO_4:Na:CO_3:Cl$ of 1:2:8.2:4:2. The solution was heated at a rate of 0.3° C./minute to boiling and was boiled for one hour. 183.2 grams of product was recovered for a yield of 83.9 percent based on $ZrO_2$. The product was comprised of uniformly sized particles of from about 25–50 microns. Ionic composition was $Na_{1.2}Zr_1(CO_3)_1$.

EXAMPLE FIVE 110.8 grams of sodium sulfate (0.78 mole) was dissolved in 260 ml of 1.5 molar zirconium oxychloride solution (0.39 mole). This solution was then slowly added to 390 ml of a 2 molar sodium carbonate solution with stirring to form a metastable solution having a molar ratio of ions $ZrO_2:SO_4:Na:CO_3:Cl$ of 1:2:8:2:2.

A precipitate formed but was redissolved. The reaction mixture was then heated at 0.3° C./minute to 100° C. and boiled for approximately one hour. 177.0 grams of product was comprised of uniformly sized particles of from about 50-75 microns and had an ionic composition of $Na_1Zr_1(CO_3)_1$. Precipitation began at 48° C. The yield based on $ZrO_2$ was 92%.

EXAMPLE SIX 293 ml of 1.67 molar acid zirconium sulfate solution (0.49 mole) was partially neutralized with 0.98 mole of sodium hydroxide solution and 0.05 mole of sodium carbonate solution. The solution was then slowly added to 400 ml of 2.45 molar sodium carbonate solution. A precipitate was formed and quickly redissolved. To the resultant solution was added 200 ml of 4.9 molar sodium chloride solution to form a metastable solution. The metastable solution had a molar ratio of ions of $ZrO_2:SO_4:Na:CO_3:Cl$ of 1:2:8.2:2:2. The final volume was adjusted to 1,000 ml by adding water. 800 ml was heated at 0.3° C./minute to about 100° C. The remaining 200 ml was maintained at room temperature and was stable for approximately 24 to 48 hours. The 800 ml was boiled for approximately one hour to form 195.1 grams of product for a yield of 87.8 percent based on $ZrO_2$. The product was comprised of uniformly sized particles from about 50-75 microns and had an ionic formula of $Na_1Zr_1(CO_3)_1$. Precipitation began at 48° C.

EXAMPLE SEVEN 585 ml of 1.66 molar acid zirconium sulfate solution was neutralized with 1.95 moles of sodium hydroxide and 0.1 mole of sodium carbonate to a pH of 1.6. The resultant solution was then added with stirring to 1 liter of 1.95 molar sodium carbonate. A precipitate formed but was redissolved. To the resultant solution was added 400 ml of 4.88 molar sodium chloride and the final volume was adjusted to 2 liters by adding water. The metastable solution had a molar ratio of ions of $ZrO_2:SO_4:Na:CO_3:Cl$ of 1:2:8.2:2:2. The solution was then placed in a stainless steel pressure vessel and heated to boiling. The pressure inside the container reached a maximum of 12.5 psig. and the temperature reached a maximum of 120° C. 435 grams of product was formed for a yield of 93.5% based on $ZrO_2$. The product was comprised of uniformly sized particles from about 50-75 microns and had an ionic formula of $Na_{0.9}Zr_1(CO_3)_{0.83}$.

EXAMPLE EIGHT 100 grams of the sodium zirconium carbonate prepared in Example 6 was slurried with 250 ml water and 50 ml of 12 molar sodium hydroxide solution was added with stirring. After 30 minutes the hydrous zirconium oxide product was decant washed 3 times with water and then reslurried in water. The pH was adjusted to 7.0 with sulfuric acid. The product was filtered on a Buchner funnel, washed with 1 liter of water and air dried at ambient temperature. There was no apparent change in particle size or distribution. The air dried hydrous zirconium oxide weighed 32.8 grams and the $ZrO_2$ content was 65%. The yield from sodium zirconium carbonate was 98.5% and the overall yield from acid zirconium sulfate was 86.6%.

EXAMPLE NINE 261 grams of sodium zirconium carbonate prepared according to the method of Example 6 (29.7% $ZrO_6$) was slurried with 440 ml water and heated to 90° C. 310 ml of 6.05 molar phosphoric acid (1.88 moles) was then slowly added with stirring over a period of 30 minutes. The mixture was stirred for an additional 30 minutes. The zirconium phosphate product was settled and decant washed. The product was filtered on a Buchner funnel. There was no apparent change in particle size or distribution. The wet cake weighed 362.8 grams and had a $ZrO_2$ content of 20.7%. The yield from sodium zirconium carbonate was 96.9%.

According to the method of Example 6, additional experiments were performed to define the parameters of the metastable solution ion concentrations and of the process. The results are set forth in the following Table I

TABLE I

| Exp. No. | Ion Mole Ratio $Zr:SO_4:Na:CO_3:Cl$ | Part size range (microns) | Yield | $Na_AZr_B(CO_3)_C$ |
|---|---|---|---|---|
| 10 | 1:2:7.2:2:1 | 5-10 | 88.9% | 1.1:1:* |
| 11 | 1:2:9.1:2.5:2 | 25-50 | 79.9% | 1.1:1:1.2 |
| 12 | 1:2:8.2:2:2 (.24 molar $ZrO_2$) | Metastable solution not formed. | | |
| 13 | 1:2:8.2:2:2 (.33 molar $ZrO_2$) | 10-20; 60-125** | 92.7% | .84:1:.85 |
| 14 | 1:2:7.2:2:1 (.81 molar $ZrO_2$) | 10-25 | 85.8% | 1.1:1:1.1 |
| 15 | 1:3:10:2:2 | 25-50 | 88.1% | 1.1:1:1.4 |
| 16 | 1:2:9.2:2:3 | Formed gel on water washing | | |

*Undetermined
**About 25% of the particles were in the 10-20 range, however, those smaller particles clearly appeared to be pieces broken from the larger particles and not independently formed particles.

Particle sizes of the compounds of the invention were determined by photographing representative samples of precipitates formed according to the method of the invention. The photographs were made at 150× magnification. A transparent graduated grid was placed over the photographs and the number of particles in successive size classifications were counted. Measured diameter was taken as the longest axis. For products having particles generally in the 20-75 micron range the grid gradations corresponded to 25 micron increments. For products having generally smaller size particles the grid gradations corresponded to 10 micron increments. After allowing for occasional skewing of the results where two particles are cemented together, particulate products formed according to the method of the invention and having number median particle diameters of 3, 10, 30, 35-40 and 60 microns had 90% of their particles within ±50% of the number median diameter. In several instances 90% of the particles would fall within ±30% of the number median diameter.

While preferred embodiments and applications of this invention have been shown and described, it will be apparent to those skilled in the art that many more modifications are possible without departing from the inventive concepts herein described. For example, other zirconium compounds could be utilized to supply the zirconium ions for the metastable solution such as chlorides and basic chlorides of zirconium, sulfates and basic sulfates of zirconium and hydrous oxides and carbonates of zirconium (both normal and basic forms).

The invention, therefore, is not to be restricted except as is necessary by the prior art and by the spirit of the appended claims.

We claim:

1. A particulate sodium zirconium carbonate hydrate product which is substantially water insoluble, is non-crystalline and, after drying at 70° C. for two hours, is a hexahydrate having an index of refraction of from about 1.64 to about 1.67, said compound having an ionic composition corresponding to analysis, exclusive of water of hydration, as follows:

$$(Na)_A(Zr)_B(CO_3)_C$$

wherein, when B, determined as $ZrO_2$, is assigned the value 1, A has a value of from about 0.8 to about 1.2 and C, determined as $CO_2$, has a value of from about 0.8 to about 1.2.

2. The product of claim 1 having a substantially uniform particle size.

3. The product of claim 2 wherein the number median diameter of said particles is within the range of from about 2 to about 75 microns.

4. A particulate non-crystalline, substantially water insoluble sodium zirconium carbonate hydrate product having a substantially uniform particle size and which, after drying at 70° C. for two hours, is a hexahydrate having an index of refraction of from about 1.64 to about 1.67, said product having an ionic composition corresponding to analysis, exclusive of water of hydration, of:

$$(Na)_A(Zr)_B(CO_3)_C$$

wherein, when B, determined as $ZrO_2$, is assigned the 1, A has a value of from about 0.8 to 1.2, and C, determined as $CO_2$, has a value of from about 0.8 to about 1.2 and said product being formed by the process comprising the steps of:

(a) preparing a metastable solution comprising zirconium, sodium, sulfate and carbonate ions and having a pH of from about 8 to about 11.5, the molar ratios of said sodium, sulfate and carbonate ions to each zirconium ion being within the ranges of from about 6 to about 10, from about 2 to about 3 and from about 2 to about 4 respectively and the concentration of said zirconium ions in said solution being from about 0.3 molar to about 0.9 molar, wherein said solution may further comprise chloride ions which when present do not exceed a molar ratio of about 2 chloride ions to one zirconium ion;

(b) heating said metastable solution to greater than about 90° C.; and, (c) holding said solution at greater than about 90° C. for sufficient time to allow formation of said product.

5. The product of claim 4 wherein the source of said zirconium ions is selected from the group consisting of sulfates and basic sulfates, chlorides and basic chlorides of zirconium and mixtures thereof; the source of said sodium ions is selected from the group consisting of carbonates of sodium, sodium hydroxide, sodium chloride, sodium sulfates, and mixtures thereof; the source of said sulfate ions is selected from the group consisting of zirconium sulfates and basic sulfates, sodium sulfates, sulfuric acid and mixtures thereof; the source of said carbonate ions is selected from the group consisting of carbonates of sodium, carbonic acid and mixtures thereof; and the source of said chloride ions, when chloride ions are present, is selected from the group consisting of sodium chloride, hydrochloric acid, chlorides and basic chlorides of zirconium, and mixtures thereof.

6. The product of claim 4 or 5 wherein the number median diameter of said particles is within the range of from about 2 to about 75 microns.

7. The method for the preparation of a particulate sodium zirconium carbonate hydrate product having a substantially uniform particle size and which, after drying at 70° C. for two hours, is a hexahydrate having an index of refraction of from about 1.64 to about 1.67 said product having an ionic composition corresponding to analysis, exclusive of water of hydration, as follows:

$$(Na)_A(Zr)_B(CO_3)_C$$

wherein, when B, determined as $ZrO_2$ is assigned the value 1, A has a value of from about 0.8 to about 1.2, and C, determined as $CO_2$, has a value of from about 0.8 to about 1.2, said method comprising the steps of:

(a) preparing a metastable solution comprising zirconium, sodium, sulfate and carbonate ions and having a pH of from about 8 to about 11.5, the molar ratios of said sodium, sulfate and carbonate ions to each zirconium ion in said solution being within the ranges of from about 6 to about 10, from about 2 to about 3 and from about 2 to about 4 respectively and the concentration of said zirconium ions in said solution being from about 0.3 molar to about 0.9 molar, wherein said solution may further comprise chloride ions which when present do not exceed a molar ratio of about 2 chloride ions to one zirconium ion;

(b) heating said metastable solution to greater than about 90° C.; and, (c) holding said solution at greater than about 90° C. for sufficient time to allow formation of said product.

8. The method of claim 7 wherein the source of said zirconium ions is selected from the group consisting of sulfates and basic sulfates, chlorides and basic chlorides of zirconium and mixtures thereof; the source of said sodium ions is selected from the group consisting of carbonates of sodium, sodium hydroxide, sodium chloride, sodium sulfates, and mixtures thereof; the source of said sulfate ions is selected from the group consisting of zirconium sulfates and basic sulfates, sodium sulfates, sulfuric acid and mixtures thereof; the source of said carbonate ions is selected from the group consisting of carbonates of sodium, carbonic acid and mixtures thereof; and the source of said chloride ions, when chloride ions are present, is selected from the group consisting of sodium chloride, hydrochloric acid, chlorides and basic chlorides of zirconium, and mixtures thereof.

9. The method of claim 7 or 8 wherein the pH of the metastable solution is from about 9.5 to about 10.0.

10. The method of claim 7 or 8 wherein the metastable solution is heated to at least about 100° C.

11. The method of claim 7 or 8 wherein the metastable solution is heated to its boiling point.

12. The method of claim 7 or 8 wherein the metastable solution is heated to boiling and boiled for at least about one hour.

13. The method of claim 7 or 8 wherein the source of said zirconium ions is acid zirconium sulfate, zirconium oxychloride or mixtures thereof.

14. The method of claim 7 or 8 wherein the molar ratio of $ZrO_2:SO_4:Na:CO_3:Cl$ is about 1:2:8:2:2.

15. The method of claim 22 wherein the metastable solution is heated to at least about 100° C.

16. The method of claim 7 or 8 wherein said time for step 3 is at least about 1 hours.

17. The method of claim 16 wherein said time is at least about 6 hours.

18. The method of claim 7 or 8 wherein the rate of heating said metastable solution is from about 0.3 to about 0.5° C. per minute.

19. The method of claim 12 wherein the rate of heating said metastable solution is from about 0.3 to about 0.5° C. per minute.

20. The method of claim 7 or 8 wherein the product has a substantially uniform particle size.

21. The method of claim 20 wherein the number median diameter of said particles is within the range from about 2 to about 75 microns and the rate of heating the meta-stable solution is from about 0.3° C. to about 1.5° C. per minute.

22. The method of claim 7 or 8 wherein steps used to prepare the metastable solution comprise:
(a) partially neutralizing an aqueous solution of a zirconium compound selected from the group consisting of acid zirconium sulfate, zirconium oxychloride and mixtures thereof to a pH of about 1.6 with an aqueous solution of a base selected from the group consisting of carbonates of sodium, sodium hydroxide and mixtures thereof to form a zirconium solution; and
(b) adjusting the pH of said zirconium solution to from about 8 to about 11.5 by adding it to an aqueous solution of a base selected from the group consisting of carbonates of sodium and mixtures thereof.

23. The method of claim 7 or 8 wherein the metastable solution is heated to its boiling point.

24. The method of claim 22 wherein said holding time for step (b) is at least about 1 hour.

25. The method of claim 24 wherein said time is at least about 6 hours.

26. The method of claim 22 wherein the metastable solution is heated to boiling for at least about one hour.

27. The method of claim 22 wherein the rate of heating said metastable solution is from about 0.3 to about 0.5° C. per minute.

28. The method of claim 26 wherein the rate of heating said metastable solution is from about 0.3 to about 0.5° C. per minute.

29. The method of claim 7 or 8 wherein a step used to prepare the metastable solution comprises:
adjusting the pH of an aqueous solution of a zirconium compound selected from the group consisting of acid zirconium sulfate, zirconium oxychloride and mixtures thereof to from about 8 to about 11.5 by adding said solution to an aqueous solution of a base selected from the group consisting of carbonates of sodium and mixtures thereof.

30. The method of claim 22 wherein the pH of the metastable solution is from about 9.5 to about 10.0.

31. The method of claim 29 wherein the pH of the metastable solution is from about 9.5 to about 10.0.

32. The method of claim 29 wherein the metastable solution is heated to at least about 100° C.

33. The method of claim 29 wherein the metastable solution is heated to its boiling point.

34. The method of claim 29 wherein the rate of heating said metastable solution is from about 0.3 to about 0.5° C. per minute.

35. The method of claim 29 wherein said holding time for step (b) is at least about 1 hour.

36. The method of claim 35 wherein said time is at least about 6 hours.

37. The method of claim 29 wherein the metastable solution is heated to boiling and boiled for at least about one hour.

38. The method of claim 37 wherein the rate of heating said metastable solution is from about 0.3 to about 0.5° C. per minute.

* * * * *

UNITED STATES PATENT OFFICE
CERTIFICATE OF CORRECTION

Patent No. 4,256,718     Dated March 17, 1981

Inventor(s) Mary J. McARTHUR

It is certified that error appears in the above-identified patent and that said Letters Patent are hereby corrected as shown below:

On the front page of the patent (disclosing the inventor, assignee, Abstract, etc.), under "References Cited; U.S. Patents" correct the reference to Brugger et al as follows:

⋮

4,042,672     8/1977     Brugger et al     423/419R

In Col. 1, line 27, underline "Vol. II".

In Col. 8, Table I, line 22, correct the abbreviation of "Part".

In Claim 1, Col. 9, line 9, replace "compound" by "product".

In Claim 4, Col. 9, line 45, insert a comma (",") after "respectively,".

In Claim 16, Col. 11, line 6, replace "3" by "(c)".

In Claim 21, Col. 11, line 17, replace "Claim 20" by "Claim 7 or 8".

In Claim 23, Col. 11, line 38, replace "Claim 7 or 8" by "Claim 22".

UNITED STATES PATENT AND TRADEMARK OFFICE
CERTIFICATE OF CORRECTION

PATENT NO. : 4,256,718

DATED : March 17, 1981

INVENTOR(S) : Mary J. McArthur

It is certified that error appears in the above—identified patent and that said Letters Patent is hereby corrected as shown below:

In column 12, delete "claim 31".

*Signed and Sealed this*

*Twenty-ninth* Day of *December 1981*

[SEAL]

Attest:

Attesting Officer

GERALD J. MOSSINGHOFF

*Commissioner of Patents and Trademarks*